United States Patent
Isoda et al.

(10) Patent No.: US 7,442,943 B2
(45) Date of Patent: Oct. 28, 2008

(54) RADIATION IMAGE STORAGE PANEL

(75) Inventors: Yuji Isoda, Kanagawa (JP); Hiroshi Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/943,929

(22) Filed: Sep. 20, 2004

(65) Prior Publication Data

US 2005/0077479 A1    Apr. 14, 2005

(30) Foreign Application Priority Data

Sep. 18, 2003    (JP) .............................. 2003-326568

(51) Int. Cl.
*G03B 42/08*    (2006.01)

(52) U.S. Cl. ................................... 250/484.4

(58) Field of Classification Search .............. 250/484.4, 250/483.1
See application file for complete search history.

(56) References Cited

U.S. PATENT DOCUMENTS

| | | | |
|---|---|---|---|
| 4,879,202 A * | 11/1989 | Hosoi et al. ............... | 250/484.4 |
| 6,713,776 B2 | 3/2004 | Takahashi | |
| 2001/0007352 A1* | 7/2001 | Hell et al. ................. | 250/484.4 |
| 2003/0047697 A1* | 3/2003 | Iwabuchi et al. ......... | 250/484.4 |

* cited by examiner

*Primary Examiner*—Constantine Hannaher
(74) *Attorney, Agent, or Firm*—Sughrue Mion, PLLC

(57) ABSTRACT

In a radiation image storage panel having a support, an underlayer, and a phosphor layer of a phosphor composed of a matrix compound and an activator and is formed on the underlayer by a gas phase-accumulation method, the underlayer consists essentially of the matrix compound and has a relative density lower than a relative density of the phosphor layer.

7 Claims, 1 Drawing Sheet

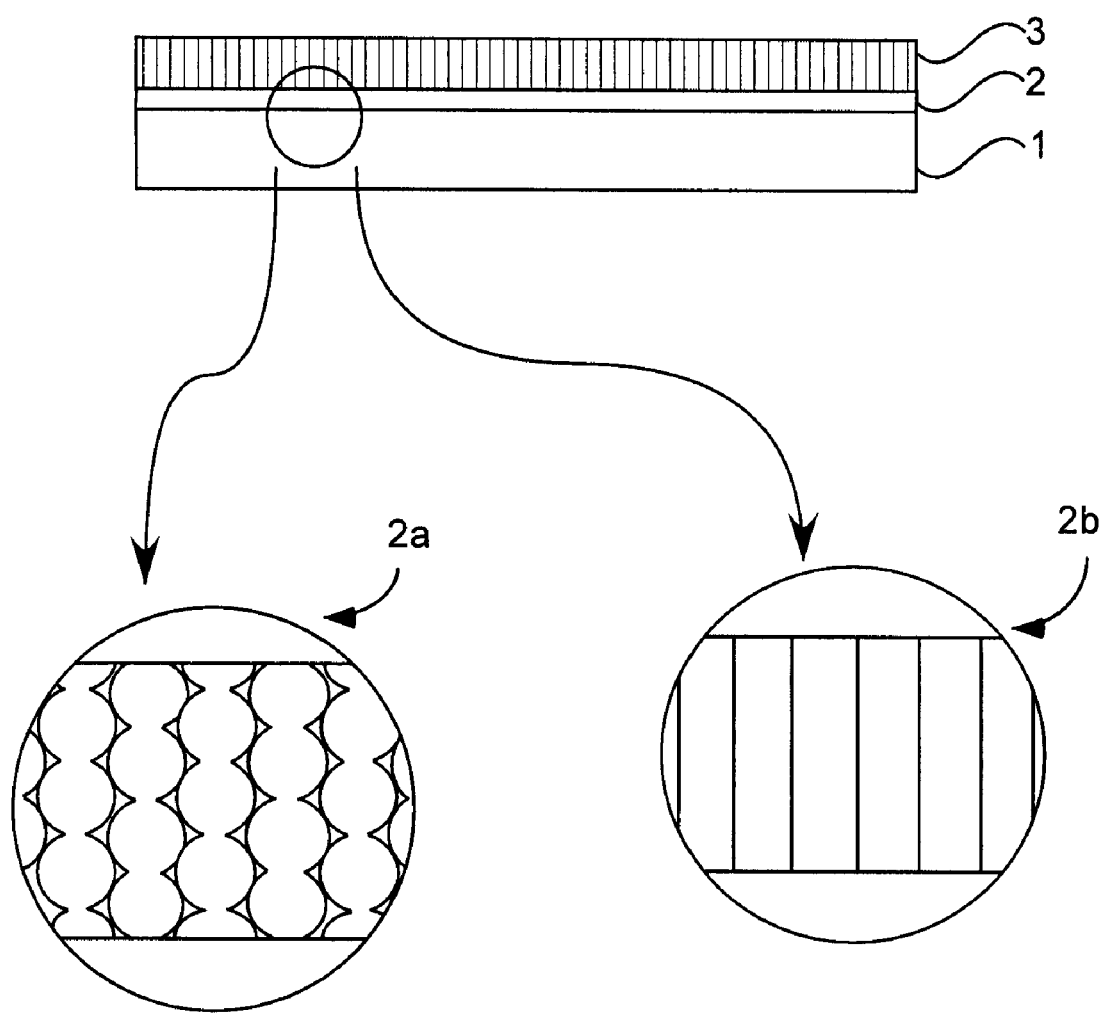

RADIATION IMAGE STORAGE PANEL

FIELD OF THE INVENTION

The present invention relates to a radiation image storage panel employable in a radiation image recording and reproducing method utilizing an energy-storable phosphor.

BACKGROUND OF THE INVENTION

When an energy-storable phosphor (e.g., stimulable phosphor, which gives off stimulated emission) is exposed to radiation such as X-rays, it absorbs and stores a portion of energy of the radiation. The phosphor then produces stimulated emission according to the level of the stored energy when exposed to electromagnetic wave such as visible or infrared light (i.e., stimulating light). A radiation image recording and reproducing method utilizing the energy-storable phosphor has been widely employed in practice. In that method, a radiation image storage panel, which is a sheet comprising the energy-storable phosphor, is used. The method comprises the steps of; exposing the storage panel to radiation having passed through an object or having radiated from an object, so that radiation image of the object is temporarily recorded in the storage panel; sequentially scanning the storage panel with a stimulating light such as a laser beam to emit a stimulated light; and photoelectrically detecting the emitted light to obtain electric image signals. The storage panel thus processed is then subjected to a step for erasing radiation energy remaining therein, and then stored for the use in the next recording and reproducing procedure. Thus, the radiation image storage panel can be repeatedly used.

The radiation image storage panel (often referred to as energy-storable phosphor sheet) has a basic structure comprising a support and a phosphor layer provided thereon. However, if the phosphor layer is self-supporting, the support may be omitted. Further, a protective layer is generally provided on the free surface (surface not facing the support) of the phosphor layer to keep the phosphor layer from chemical deterioration or physical damage.

Various kinds of phosphor layers are known and used. For example, a phosphor layer comprising a binder and an energy-storable phosphor dispersed therein is generally used, and a phosphor layer comprising agglomerate of an energy-storable phosphor without binder is also known. The latter layer can be formed by a gas phase-accumulation method or by a firing method.

The radiation image recording and reproducing method (or radiation image forming method) has various advantages as described above. It is still desired that the radiation image storage panel used in the method have as high sensitivity as possible and, at the same time, give a reproduced radiation image of high quality (in regard to sharpness and graininess).

In order to improve the sensitivity and the image quality, it has been proposed that the phosphor layer of the radiation image storage panel be prepared by a gas phase-accumulation method such as vacuum vapor deposition, sputtering or chemical vapor deposition (CVD). The process of vacuum vapor deposition, for example, comprises the steps of: heating to vaporize an evaporation source comprising a phosphor or starting materials thereof by means of a resistance heater or an electron beam, and depositing and accumulating the vapor on a substrate such as a metal sheet to form a layer of the phosphor in the form of columnar crystals.

The phosphor layer formed by a gas phase-accumulation method contains no binder and consists essentially of phosphor, and there are gaps among the columnar crystals of the phosphor. Because of the presence of gaps in the phosphor layer, the stimulating light can stimulate the phosphor efficiently and the emitted light can be collected efficiently. Accordingly, a radiation image storage panel having such phosphor layer has high sensitivity. Further, since the gaps in the phosphor layer prevent the stimulating light from diffusing parallel to the phosphor layer, the radiation image storage panel can give a reproduced radiation image of high sharpness.

Japanese Patent Provisional Publication 2003-050298 discloses a process for preparation of a radiation image storage panel by gas phase-accumulation. In the disclosed process, a layer of a phosphor matrix compound in the form of columnar crystals is first formed on a support by gas phase-accumulation utilizing an electron beam under a high vacuum such as $1 \times 10^{-3}$ Pa, and then a phosphor layer comprising the matrix compound and an activator is formed thereon (so that each columnar crystal of the phosphor may be one-to-one grown on each columnar crystal of the lower phosphor matrix layer) by gas phase-accumulation utilizing an electron beam under a high vacuum condition such as $1 \times 10^{-3}$ Pa. Thus prepared phosphor layer is improved in columnar crystallinity.

The inventors of the present invention have studied the process described in the above-mentioned Japanese Patent Provisional Publication, and found that the phosphor layer which is firmly combined with the underlayer easily separates from the support, because the underlayer (i.e., the first formed matrix compound layer) shows no function to relax stress applied to the radiation image storage panel.

SUMMARY OF THE INVENTION

It is an object of the present invention to provide a radiation image storage panel improved not only in sensitivity but also in mechanical strength.

The present invention resides in a radiation image storage panel comprising a support, an underlayer, and a phosphor layer which comprises a phosphor composed of a matrix compound and an activator and which is formed on the underlayer by a gas phase-accumulation method, in which the underlayer consists essentially of the matrix compound and has a relative density lower than a relative density of the phosphor layer.

In the invention, the "relative density (%)" means a density relative to the inherent density of material constituting the layer such as the phosphor matrix compound layer or the phosphor layer. The phosphor matrix compound layer (i.e., underlayer) may further contain a small amount (less than 0.1 wt. %) of an activator, impurities, and/or additives.

The above-mentioned radiation image storage panel of the invention can be manufactured by a process for preparing a radiation image storage panel of claim 1, comprising the steps of:

depositing the matrix compound on the support by a gas phase-accumulating method performed at a pressure of 0.05 to 10 Pa, to produce the underlayer having a relative density less than a relative density of the phosphor layer; and depositing the matrix compound and activator simultaneously on the underlayer by a gas phase-accumulating method performed at a pressure of 0.05 to 10 Pa, to produce the phosphor layer.

The underlayer of the radiation image storage panel of the invention serves not only to impart to the upper phosphor layer an improved crystallinity (which is effective to increase sensitivity) but also to relax stress applied to the storage panel (which is effective to improve mechanical strength of the storage panel).

BRIEF DESCRIPTION OF DRAWINGS

FIGURE shows a partial sectional view schematically illustrating a constitution of a radiation image storage panel according to the invention.

DETAILED DESCRIPTION OF THE INVENTION

Preferred embodiments of the radiation image storage panel according to the invention are as follows.

(1) The relative density of the underlayer is in the range of 80% to 98%.

(2) The relative density of the underlayer is in the range of 85% to 95%.

(3) The underlayer has a thickness less than a thickness of the phosphor layer under the following condition:

0.01<thickness of underlayer/thickness of phosphor layer<0.5.

(4) The underlayer is formed on the support by a gas phase-accumulation method.

(5) The phosphor is an energy-storable phosphor.

(6) The energy-storable phosphor is a stimulable alkali metal halide phosphor represented by the formula (I):

$$M^I X \cdot a M^{II}{}'_2 \cdot b M^{III} X''_3 : zA \qquad (I)$$

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Mg, Cu and Bi; and a, b and z are numbers satisfying the conditions of $0 \leq a < 0.5$, $0 \leq b < 0.5$ and $0 < z < 1.0$, respectively.

(7) In formula (1), $M^I$ is Cs, X is Br, A is Eu, and z is a number satisfying the condition of $1 \times 10^{-4} \leq z \leq 0.1$.

(8) The step for the production of the underlayer and the step for the production of the phosphor layer are performed successively.

(9) The production of the underlayer and the step for the production of the phosphor layer are performed by a resistance-heating method.

The radiation image storage panel of the invention is further described by referring to FIGURE in the attached drawing.

In FIGURE, the radiation image storage panel is composed of a support (substrate) 1, an underlayer 2, and a phosphor layer 3. The phosphor layer 3 comprises a phosphor matrix compound and an activator and has been formed on the underlayer by a gas phase-accumulation method.

The underlayer 2 mainly comprises a phosphor matrix compound and has a relative density lower than a relative density of the upper phosphor layer 3. The relative density of the underlayer 2 preferably is in the range of 80 to 98%, more preferably 85 to 95%.

The underlayer 2 preferably has a thickness less than a thickness of the phosphor layer under the following condition:

0.01<(thickness of underlayer)/(thickness of phosphor layer)<0.5.

For instance, when the thickness of the phosphor layer 3 is 500 μm, the thickness of the underlayer 2 preferably is more than 5 μm and less than 250 μm.

The underlayer 2 is preferably prepared by a gas phase-accumulation method. Therefore, it is preferred that the underlayer 2 and the phosphor layer are successively prepared by a gas phase-accumulation method such as a vapor evaporation method at a pressure of 0.05 to 10 Pa, that is, under a medium vacuum condition.

The underlayer 2 preferably comprises aggregates of spherical crystals 2a having several μm or a structure of columnar crystals 2b.

The radiation image storage panel is by no means restricted to the structure illustrated in FIGURE, and may have, for example, a protective layer and various auxiliary layers as described later.

In the following description, the process for preparation of the radiation image storage panel of the invention is explained in detail, by way of example, in the case where the phosphor is an energy-storable phosphor and the underlayer is also formed by a gas phase-accumulation method and where a vapor deposition process employing a resistance-heater is adopted as the gas phase-accumulation method. Since the vapor deposition utilizing a resistance-heater can be carried out under a medium vacuum condition, it is easy to form a vapor-deposited layers excellent in columnar crystallinity.

The substrate on which the vapor is deposited is that generally used as a support of the radiation image storage panel, and hence can be optionally selected from known materials conventionally used as a support of storage panel. The substrate is preferably a sheet of quartz glass, sapphire glass; metal such as aluminum, iron, tin or chromium; or heat-resistant resin such as aramide. Particularly preferred is an aluminum plate. For improving the sensitivity or the image quality (e.g., sharpness and graininess), a conventional radiation image storage panel often has a light-reflecting layer containing a light-reflecting material such as titanium dioxide or a light-absorbing layer containing a light-absorbing material such as carbon black. These auxiliary layers can be placed in the storage panel of the invention. Further, in order to accelerate growth of the columnar crystals, a great number of very small convexes or concaves may be provided on the substrate surface on which the vapor is deposited. If an auxiliary layer such as a subbing layer (e.g., adhesive layer), a light-reflecting layer or a light-absorbing layer is formed on the deposited-side surface of the substrate, the convexes or concaves may be provided on the surface of the auxiliary layer.

The energy-storable phosphor preferably is a stimulable phosphor giving off stimulated emission in the wave-length region of 300 to 500 nm when exposed to a stimulating ray in the wavelength region of 400 to 900 nm.

The phosphor particularly preferably is a stimulable alkali metal halide phosphor represented by the formula (I):

$$M^I X \cdot a M^{II}{}'_2 \cdot b M^{III} X''_3 : zA \qquad (I)$$

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Mg, Cu and Bi; and a, b and z are numbers satisfying the conditions of $0 \leq a < 0.5$, $0 \leq b < 0.5$ and $0 < z < 1.0$, respectively.

In the formula (I), z preferably is a number satisfying the condition of $1 \times 10^{-4} \leq z \leq 0.1$; $M^I$ preferably comprises at least Cs; X preferably comprises at least Br; and A is preferably Eu or Bi, more preferably Eu. The phosphor represented by the formula (I) may further comprise metal oxides such as aluminum oxide, silicon dioxide and zirconium oxide as additives in an amount of 0.5 mol or less based on one mol of $M^IX$.

As the phosphor, it is also preferred to use a rare earth activated alkaline earth metal fluoride halide stimulable phosphor represented by the formula (II):

$$M^{II}FX:zLn \qquad (II)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (II), $M^{II}$ preferably comprises Ba more than half of the total amount of $M^{II}$, and Ln preferably is Eu or Ce. The $M^{II}FX$ in the formula (II) represents a matrix crystal structure of BaFX type, and it by no means indicates stoichiometrical composition of the phosphor. Accordingly, the molar ratio of F:X is not always 1:1. It is generally preferred that the BaFX type crystal have many $F^+(X^-)$ centers corresponding to vacant lattice points of $X^-$ ions since they increase the efficiency of stimulated emission in the wavelength region of 600 to 700 nm. In that case, F is often slightly in excess of X.

Although not described in the formula (II), one or more additives such as bA, $wN^I$, $xN^{II}$ and $yN^{III}$ may be incorporated into the phosphor of the formula (II). A is a metal oxide such as $Al_2O_3$, $SiO_2$ or $ZrO_2$. In order to prevent $M^{II}FX$ particles from sintering, the metal oxide preferably has low reactivity with $M^{II}FX$ and the primary particles of the oxide are preferably super-fine particles of 0.1 µm or less diameter. $N^I$ is a compound of at least one alkali metal selected from the group consisting of Li, Na, K, Rb and Cs; $N^{II}$ is a compound of alkaline earth metal(s) Mg and/or Be; and $N^{III}$ is a compound of at least one trivalent metal selected from the group consisting of Al, Ga, In, Tl, Sc, Y, La, Gd and Lu. The metal compounds preferably are halides, but are not restricted to them.

b, w, x and y represent amounts of the additives incorporated into the starting materials, provided that the amount of $M^{II}FX$ is assumed to be 1 mol. They are numbers satisfying the conditions of $0 \leq b \leq 0.5$, $0 \leq w \leq 2$, $0 \leq x \leq 0.3$ and $0 \leq y \leq 0.3$, respectively. These numbers by no means always represent the contents in the resultant phosphor because some of the additives decrease during the steps of firing and washing performed thereafter. Some additives remain in the resultant phosphor as they are added to the materials, but the others react with $M^{II}FX$ or are involved in the matrix.

In addition, the phosphor of the formula (II) may further comprise Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetrafluoro-borate compounds; hexafluoro compounds such as monovalent or divalent salts of hexa-fluorosilicic acid, hexafluoro-titanic acid and hexa-fluorozirconic acid; or compounds of transition metals such as V, Cr, Mn, Fe, Co and Ni. The phosphor employable in the invention is not restricted to the above-mentioned phosphors, and any phosphor that can be essentially regarded as rare earth activated alkaline earth metal fluoride halide stimulable phosphor can be used.

The phosphor in the invention is not restricted to the energy-storable phosphor. It may be a phosphor absorbing radiation such as X-rays and spontaneously giving off (spontaneous) emission in the ultraviolet or visible region. Examples of that phosphor include phosphors of $LnTaO_4$:(Nb, Gd) type, $Ln_2SiO_5$:Ce type and LnOX:Tm type (Ln is a rare earth element); CsX (X is a halogen); $Gd_2O_2S$:Tb; $Gd_2O_2S$:Pr, Ce; $ZnWO_4$; $LuAlO_3$:Ce; $Gd_3Ga_5O_{12}$:Cr, Ce; and $HfO_2$.

For the preparation of the radiation image storage panel of the invention, the underlayer consisting essentially of a matrix compound of the phosphor material is first formed on the support, for example, by vapor evaporation, a sputtering, or CVD. Preferably, the underlayer is formed by vapor evaporation at a pressure of 0.05 to 10 Pa. The matrix compound can be deposited on the support under almost the same conditions as those described hereinbelow for the deposition of the phosphor layer.

On the underlayer, the phosphor layer is formed by gas phase-accumlation such as vapor deposition.

In the case where a phosphor layer is formed by multi-vapor deposition (co-deposition), at least two evaporation sources are used. One of the sources contains a matrix compound of the energy-storable phosphor, and the other contains an activator compound. The multi-vapor deposition is preferred because the vaporization rate of each source can be independently controlled to incorporate the activator uniformly in the matrix even it the compounds have very different melting points or vapor pressures. According to the composition of the desired phosphor, each evaporation source may consist of the matrix compound or the activator compound only or otherwise may be a mixture thereof with additives. Three or more sources may be used. For example, in addition to the above-mentioned sources, an evaporation source containing additives may be used.

The matrix compound of the phosphor may be either the matrix compound itself or a mixture of two or more substances that react with each other to produce the matrix compound. The activator compound generally is a compound containing an activating element, and hence is, for example, a halide or oxide of the activating element.

If the activator is Eu, the Eu-containing compound of the activator compound preferably contains $Eu^{2+}$ as much as possible because the desired stimulated emission (even if, instant emission) is emitted from the phosphor activated by $Eu^{2+}$. Since commercially available Eu-containing compounds generally contain oxygen atoms, they necessarily contain both $Eu^{2+}$ and $Eu^{3+}$. The Eu-containing compounds, therefore, are preferably melted under Br gas-atmosphere so that oxygen-free $EuBr_2$ can be prepared.

The evaporation source may have a water content of not more than 0.5 wt. %. For preventing the source from bumping, it is particularly important to control the water content in the above low range if the compound of matrix or activator is a hygroscopic substance such as EuBr or CsBr. The compounds are preferably dried by heating at 100 to 300° C. under reduced pressure. Otherwise, the compounds may be heated under dry atmosphere such as nitrogen gas atmosphere to melt at a temperature above the melting point for several minutes to several hours.

The evaporation source, particularly the source containing the matrix compound, may contain impurities of alkali metal (alkali metals other than ones constituting the phosphor) in a content of 10 ppm or less and impurities of alkaline earth metal (alkaline earth metals other than ones constituting the phosphor) preferably in a content of 5 ppm or less (by weight). That is particularly preferred if the phosphor is an alkali metal halide stimulable phosphor represented by the aforementioned formula (I). Such preferred evaporation source can be prepared from compounds containing little impurities.

The two or more evaporation sources and the substrate are placed in a vacuum evaporation-deposition apparatus. The apparatus is then evacuated to give a medium vacuum of 0.05 to 10 Pa, preferably 0.05 to 3 Pa. It is particularly preferred that, after the apparatus is evacuated to a high vacuum of $1 \times 10^{-5}$ to $1 \times 10^{-2}$ Pa, an inert gas such as Ar, Ne or $N_2$ gas be introduced into the apparatus so that the inner pressure can be the above-mentioned medium vacuum. In this case, partial pressures of water and oxygen can be reduced. The apparatus can be evacuated by means of an optional combination of, for example, a rotary pump, a turbo molecular pump, a cryo pump, a diffusion pump and a mechanical booster.

For heating the evaporation sources, electric currents are then supplied to resistance heaters. The sources of matrix and activator compounds are thus heated, vaporized, and reacted with each other to form the phosphor, which is deposited and accumulated on the underlayer. The space between the substrate and each source varies depending upon various conditions such as the size of substrate, but generally is in the range of 10 to 1,000 mm, preferably in the range of 10 to 200 mm. The space between the adjoining sources generally is in the range of 10 to 1,000 mm. In this step, the substrate can be heated or cooled. The temperature of the substrate generally is in the range of 20 to 350° C., preferably in the range of 100 to 300° C. The deposition rate, which means how fast the formed phosphor is deposited and accumulated on the substrate, can be controlled by adjusting the electric currents supplied to the heaters. The deposition rate generally is in the range of 1 to 15 mg/cm²·min.

As described hereinbefore, the underlayer and the phosphor layer are preferably deposited successively on the support. This can be carried out by first heating and evaporating an evaporation source of an matrix compound only, to deposit the matrix compound on the support to form the underlayer, and then heating and evaporating the evaporation source of matrix compound and the evaporation source of an activator compound simultaneously, to deposit the desired phosphor on the underlayer. If desired, the support can be heated when the depositions are carried out. The support is preferably kept at a temperature of 20 to 350° C.

The heating with resistance heaters may be repeated twice or more to form two or more upper sub-layers.

After the deposition procedure is complete, the deposited layers are preferably subjected to heat treatment (annealing), which is carried out generally at a temperature of 100 to 300° C. for 0.5 to 3 hours, preferably at a temperature of 150 to 250° C. for 0.5 to 2 hours, under inert gas atmosphere which may contain a small amount of oxygen gas or hydrogen gas.

Thus formed deposited layers are composed of the underlayer comprising a matrix compound of the phosphor and the phosphor layer comprising an energy-storable phosphor in the form of columnar structure grown almost in the thickness direction. The phosphor layer generally has a thickness of 100 µm to 1 mm, preferably 200 µm to 700 µm.

The gas phase-accumulation method employable in the invention is not restricted to the above-described resistance heating procedure, and various other known processes such as a sputtering process and a CVD process can be used.

It is preferred to provide a protective layer on the surface of the phosphor layer, so as to ensure good handling of the storage panel in transportation and to void damage. The protective layer is preferably transparent so as not to prevent the stimulating light from coming in or not to prevent the emission from coming out. Further, for protecting the storage panel from chemical deterioration and physical damage, the protective layer preferably is chemically stable, physically strong, and of high moisture proof.

The protective layer can be provided by coating the phosphor layer with a solution in which an organic polymer such as cellulose derivatives, polymethyl methacrylate or fluororesins is dissolved in an organic solvent, by placing a beforehand prepared sheet for the protective layer (e.g., a film of organic polymer such as polyethylene terephthalate, a transparent glass plate) on the phosphor layer with an adhesive, or by depositing vapor of inorganic compounds on the phosphor layer. Various additives may be dispersed in the protective layer. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective layer generally is in the range of about 0.1 to 20 µm if the layer is made of polymer material, or in the range of about 100 to 1,000 µm if the layer is made of inorganic material such as glass.

For enhancing resistance to stain, a fluororesin layer may be further provided on the protective layer. The fluororesin layer can be form by coating the surface of the protective layer with a solution in which a fluororesin is dissolved (or dispersed) in an organic solvent, and drying the coated solution. The fluororesin may be used singly, but a mixture of the fluororesin and a film-forming resin is generally employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluororesin layer generally is in the range of 0.5 to 20 µm. For forming the fluororesin layer, additives such as a crosslinking agent, a film-hardening agent and an anti-yellowing agent can be used. In particular, the crosslinking agent is advantageously employed to improve durability of the fluororesin layer.

Thus, a radiation image storage panel of the invention can be produced. The radiation image storage panel of the invention can be in known various structures. For example, in order to improve the sharpness of the resultant image, at least one of the underlayer and phosphor layer may be colored with a colorant which does not absorb the stimulated emission but the stimulating light.

EXAMPLE 1

(1) Evaporation Source

As the evaporation sources, powdery cesium bromide (CsBr$_m$, m is nearly 2.2, purity; more than 4N) and powdery europium bromide (EuBr$_2$, purity: more than 3N) were prepared. Each was analyzed according to ICP-MS method (Inductively Coupled Plasma Mass Spectrometry), to examine contents of impurities. As a result, the CsBr powder contained each of the alkali metals (Li, Na, K, Rb) other than Cs in an amount of 10 ppm or less and other elements such as alkaline earth metals (Mg, Ca, Sr, Ba) in amounts of 2 ppm or less. The EuBr$_2$ powder contained each of the rare earth elements other than Eu in an amount of 20 ppm or less and other elements in amounts of 10 ppm or less. The powders are very hygroscopic, and hence were stored in a desiccator keeping a dry condition whose dew point was lower than −20° C. They were taken out of the desiccator, immediately before they were used.

(2) Preparation of Underlayer

An aluminum substrate (support) was washed successively with an aqueous alkaline solution, purified water, and IPA (isopropyl alcohol) and dried. The dry substrate was mounted to a substrate holder in an evaporation-deposition apparatus. Each of the CsBr and EuBr$_m$ evaporation sources were individually placed in crucibles equipped with resistance heaters, respectively. The apparatus was then evacuated to make the inner pressure $1 \times 10^{-3}$ Pa by means a combination of a rotary pump, a mechanical booster and a turbo molecular pump, and successively Ar gas was introduced to set the inner pressure at 1 Pa. The substrate was then heated to 100° C. by means of a sheath heater placed on the back side (side opposite to the surface on which the vapor is to be deposited). While a shutter placed between the substrate and each source is closed; each evaporation source was heated by means of the resistance heater. The shutter covering the CsBr source was first opened so that CsBr alone was accumulated on the substrate at a rate of 5.0 mg/cm$^2$·min., to form an underlayer of CsBr matrix compound. Thus, an underlayer (thickness: 5 μm, relative density: 87%) was formed.

(3) Preparation of Phosphor Layer

Just after the underlayer was formed on the substrate the shutter covering the EuBr$_2$ source was then opened so that stimulable CsBr:Eu phosphor was accumulated on the underlayer at the rate of 5.0 mg/cm$^2$·min., to form a phosphor layer comprising the phosphor in the form of columnar crystalline structure grown almost perpendicularly and aligned densely (relative ratio: 90%, thickness: 250 μm, area: 10 cm×10 cm). During the deposition, the electric currents supplied to the heaters were controlled so that the molar ratio of Eu/Cs in the phosphor would be $3 \times 10^{-4}/1$. After the evaporation-deposition was complete, the inner pressure was returned to atmospheric pressure and then the substrate was taken out of the apparatus.

Thus, a radiation image storage panel of the invention comprising the support, underlayer and phosphor layer was produced.

EXAMPLES 2 TO 6

The procedure (2) of Example 1 was repeated except that the period of time for the evaporation-deposition was changed so that the underlayer would have a different thickness (10 μm for Ex. 2, 20 μm for Ex. 3, 40 μm for Ex. 4, 80 μm for Ex. 5, 160 μμm for Ex. 6), to produce various radiation image storage panels according to the invention.

COMPARISON EXAMPLE 1

The procedure of Example 1 was repeated except for not providing the underlayer and the phosphor layer was deposited directly on the substrate at a rate of 1.0 mg/cm$^2$·min., to produce a conventional radiation image storage panel.

COMPARISON EXAMPLE 2

The procedure (2) of Example 1 was repeated except that the pressure and the deposition rate were changed to 10 Pa and 0.5 mg/cm$^2$·min., respectively, and further the period of time for the evaporation-deposition was changed so that the underlayer would have a thickness of 10 μm, to produce various radiation image storage panels for comparison.

COMPARISON EXAMPLE 3

The procedure (2) of Example 1 was repeated except that the pressure and the temperature of the substrate were changed to $1 \times 10^{-3}$ Pa and 300° C., respectively, and further the period of time for the evaporation-deposition was changed so that the underlayer would have a thickness of 10 μm, to produce various radiation image storage panels for comparison.

Evaluation of Radiation Image Storage Panel

The adhesion and the sensitivity of the storage panel were evaluated in the following manners.

(1) Adhesion

The adhesion of the storage panel was evaluated in accordance with the Scotch tape method described in "Formation and evaluation of thin film, and Handbook of its application (in Japanese", ed. S. Gonda, Fuji-techno system, 1984, pp. 22.

An adhesive tape (Cellotape, Nichiban Co., Ltd.) was placed on the surface of the phosphor layer, and then peeled off to make the phosphor layer separate from the support. The degree of separation of the phosphor layer was observed, and the adhesion was evaluated by allotting point 1.0 to the case where the separation is maximum in the largest area and point 5.0 to the case where the separation is minimum.

(1) Sensitivity

The radiation image storage panel was encased in a room light-shielding cassette and then exposed to X-rays (voltage: 80 kVp, current: 16 mA). The storage panel was then taken out of the cassette and excited with a He—Ne laser beam (wavelength: 633 nm), and sequentially the emitted stimulated emission was detected by a photomultiplier. On the basis of the detected stimulated emission intensity (converted into a relative value based on the intensity of Comparison Example 1), the sensitivity was determined.

The results are set forth in the following Table.

TABLE

| | Underlayer (r.d., thickness) | Phosphor layer(r.d.) | Adhesion | Sensitivity |
|---|---|---|---|---|
| Ex. 1 | 87%, 5 μm | 90% | 2.8 | 135 |
| Ex. 2 | 87%, 10 μm | 90% | 4.6 | 183 |
| Ex. 3 | 87%, 20 μm | 90% | 5.0 | 197 |
| Ex. 4 | 87%, 40 μm | 90% | 5.0 | 201 |
| Ex. 5 | 87%, 80 μm | 90% | 4.8 | 199 |
| Ex. 6 | 87%, 160 μm | 90% | 4,2 | 195 |
| Com. 1 | —, — | 90% | 1.0 | 100 |
| Com. 2 | 79%, 10 μm | 90% | 1.6 | 165 |
| Com. 3 | 99%, 10 μm | 90% | 1.2 | 155 |

Remarks:
r.d.: relative density

What is claimed is:

1. A radiation image storage panel, comprising a support, an underlayer, and a phosphor layer which comprises a phosphor in the form of columnar crystals composed of a matrix compound and an activator and which is formed on the underlayer by a gas phase-accumulation method, in which the underlayer consists essentially of the matrix compound in the form of columnar crystals or aggregates of spherical crystals and has a relative density in the range of 80% to 98% which is lower than a relative density of the phosphor layer.

2. The radiation image storage panel of claim 1, wherein the underlayer has a thickness less than a thickness of the phosphor layer under the following condition:

0.01<thickness of underlayer/thickness of phosphor layer<0.5.

3. The radiation image storage panel of claim 1, wherein the underlayer is formed on the support by a gas phase-accumulation method.

4. The radiation image storage panel of claim 1, wherein the phosphor is an energy-storable phosphor.

5. The radiation image storage panel of claim 4, wherein the energy-storable phosphor is a stimulable alkali metal halide phosphor represented by the formula (I):

$$M^I X \cdot aM^{II}X'_2 \cdot bM^{III}X''_3 : zA \qquad (I)$$

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Mg, Cu and Bi; and a, b and z are numbers satisfying the conditions of $0 \leq a < 0.5$, $0 \leq b < 0.5$ and $0 < z < 1.0$, respectively.

6. The radiation image storage panel of claim 5, wherein $M^I$ is Cs, X is Br, A is Eu, and z is a number satisfying the condition of $1 \times 10^{-4} \leq z \leq 0.1$.

7. The radiation image storage panel of claim 1, wherein the underlayer has a thickness in the range of 10 to 250 μm.

* * * * *